United States Patent [19]

Verellen et al.

[11] 4,195,054
[45] Mar. 25, 1980

[54] METHOD AND APPARATUS FOR THE MANUFACTURE OF FIBROUS CASING

[75] Inventors: Michael Verellen, Lille; Ghislain Thaens, Lommel, both of Belgium

[73] Assignee: Teepak, Inc., Chicago, Ill.

[21] Appl. No.: 898,750

[22] Filed: Apr. 21, 1978

[51] Int. Cl.² .............................................. B29D 7/22
[52] U.S. Cl. .................................... 264/558; 264/561; 264/565; 264/566; 264/568; 264/173; 425/71
[58] Field of Search .................... 264/95, 89, 209, 173, 264/561, 565–566; 425/71, 72, 326.1, 94, 558, 568

[56] References Cited

U.S. PATENT DOCUMENTS

| | | | |
|---|---|---|---|
| 1,864,006 | 6/1932 | Weingand | 425/71 |
| 1,937,225 | 11/1933 | Hewitt | 264/196 |
| 3,056,339 | 10/1962 | Sommerfeld et al. | 425/326.1 |
| 3,090,998 | 5/1963 | Heisterkamp et al. | 264/95 |
| 3,202,563 | 8/1965 | Charvet | 425/71 |
| 3,274,313 | 9/1966 | Harp, Jr. | 264/89 |
| 3,437,537 | 4/1969 | Takada | 264/89 |
| 3,450,806 | 6/1969 | Matsuo et al. | 264/95 |
| 3,679,437 | 7/1972 | Oppenheimer et al. | 264/173 |
| 3,833,022 | 9/1974 | Turbak et al. | 264/173 |

Primary Examiner—Jeffery R. Thurlow
Attorney, Agent, or Firm—Paul Shapiro; Joseph E. Kerwin; William A. Dittmann

[57] ABSTRACT

In the manufacture of fiber-reinforced cellulose casing wherein a paper tube is passed downwardly over a mandrel, impregnated with viscose and subjected to the action of a coagulating liquid to regenerate cellulose, a gas stream is flowed upwardly within the tube as the tube is passed over the mandrel, the gas stream pressure being sufficient to maintain the cylindrical dimensions of the tube but insufficient to cause a measurable change in the dimensions of the tube walls whereby contact of the internal surface of the impregnated tube with the mandrel is reduced or substantially eliminated.

8 Claims, 3 Drawing Figures

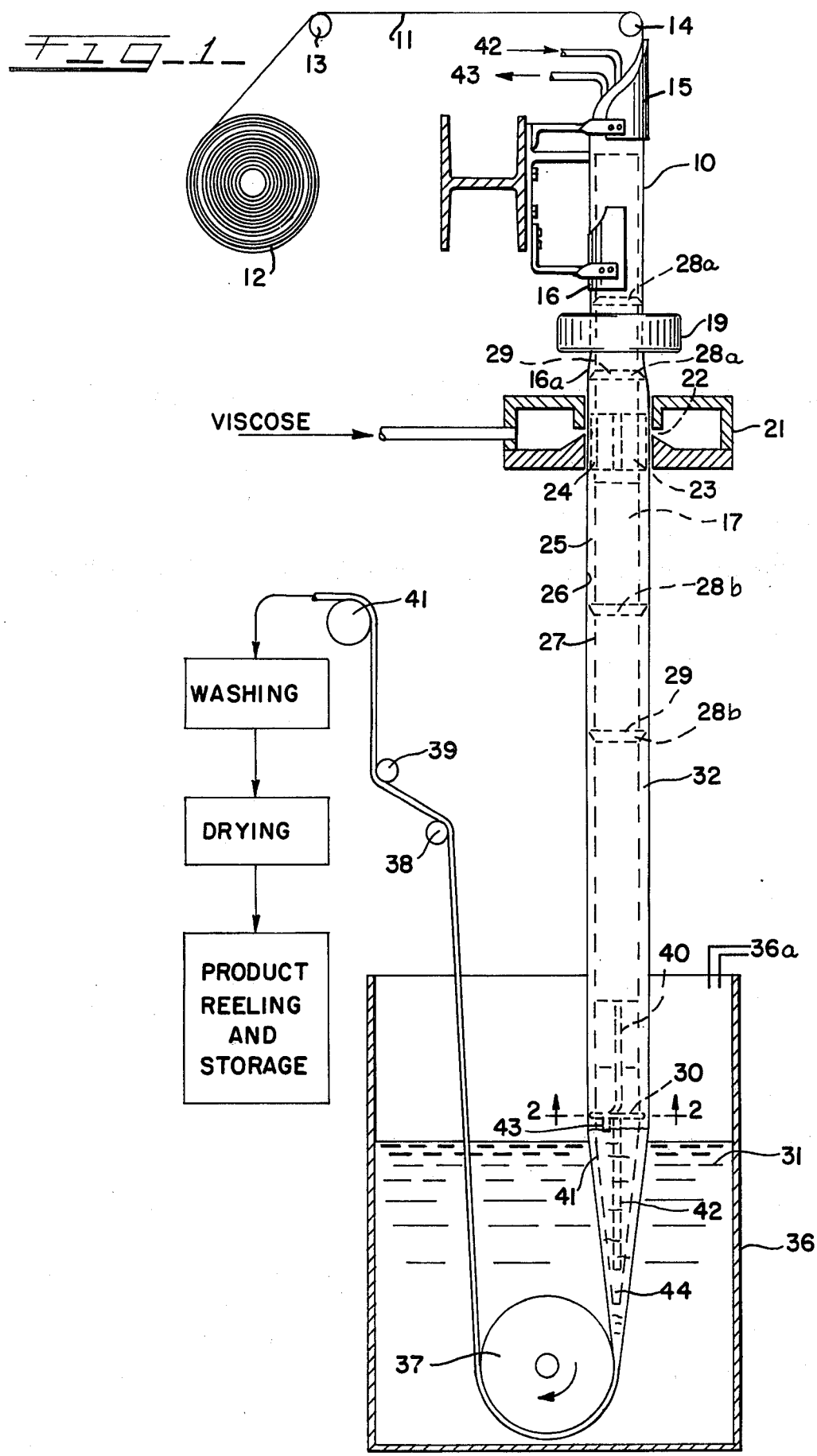

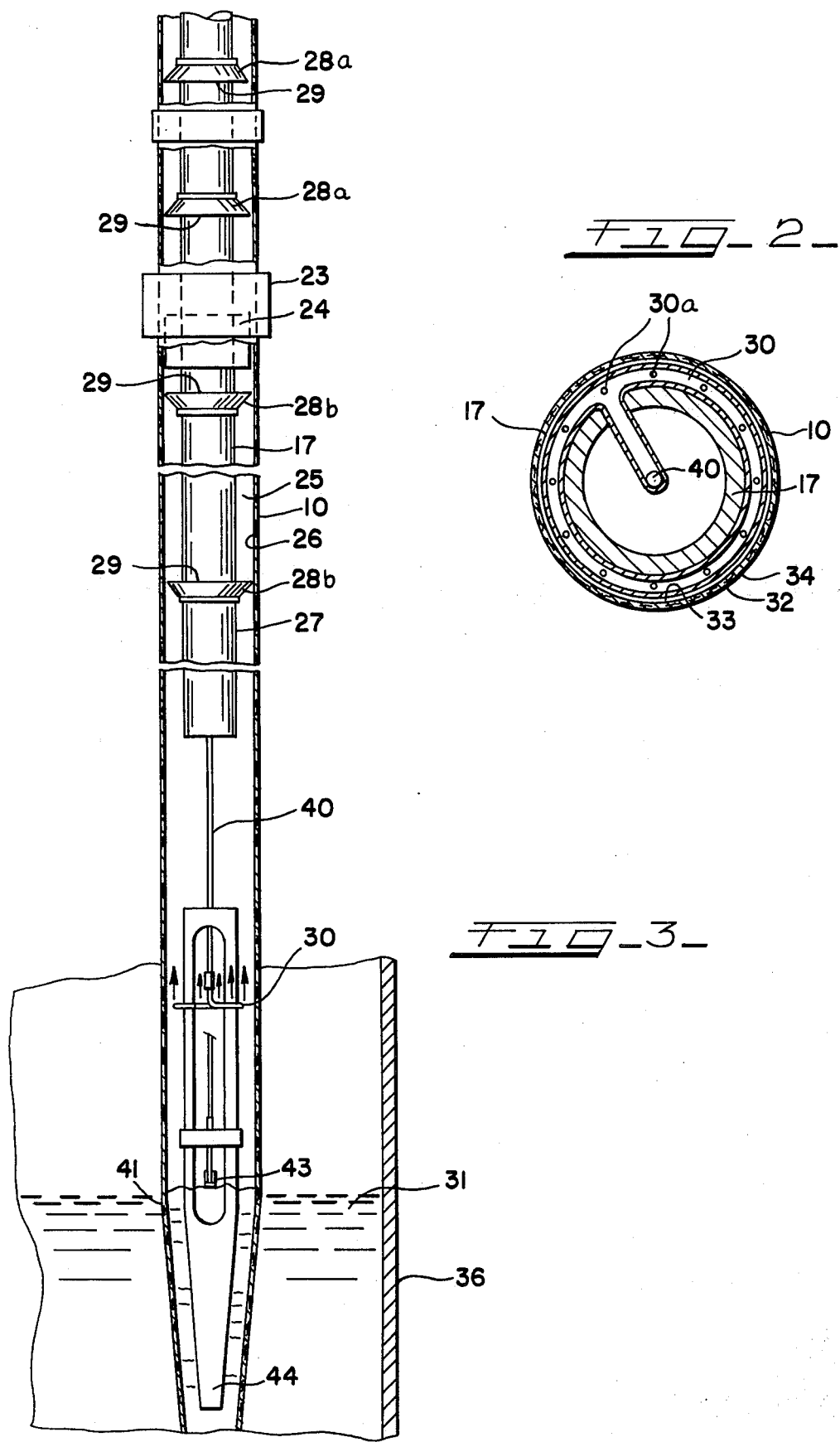

4,195,054

METHOD AND APPARATUS FOR THE MANUFACTURE OF FIBROUS CASING

BACKGROUND OF THE INVENTION

1. Field of the Invention:

This invention relates to an apparatus for the manufacture of fibrous casings.

2. Description of the Prior Art:

In the preparation of sausages by meat packers, a sausage emulsion is inserted into a natural or synthetic sausage casing which is subsequently tied off at each end and cooked. One type of synthetic casing provided to the trade is known as fibrous casing. Fibrous casing is composed of cellulosic fibers, generally in the form of a paper, which are impregnated and held together by regenerated cellulose. The paper which is used is usually a saturating tissue, preferably a long fiber hemp paper, which is formed into a tube and is impregnated with viscose solution. After the interstices of the paper have been filled with viscose solution and a coating of the solution is formed thereon, the tube is subjected to a coagulating bath to regenerate cellulose within and upon the paper. The dried product is a paper reinforced regenerated cellulose casing having relatively high strength and relatively low stretch.

When the above-disclosed procedure for the manufacture of fibrous casing is followed, difficulties are encountered during the step of viscose impregnation of the paper. In the procedure for impregnating the paper tube with viscose, a paper sheet formed into the shape of a tube proceeds downwardly over a hollow mandrel which acts to maintain the paper in tubular form during the viscose impregnation. The mandrel is further provided with a plurality of metal slip rings, e.g., 14–19 spaced along the mandrel, which function to keep the viscose impregnated paper tube from being drawn against the outside wall of the mandrel as the tube moves downwardly to the regenerating bath. After passage of the viscose impregnated tube over the mandrel, the tube enters a coagulating bath wherein the viscose on the outer surface of the tube is coagulated and regenerated. Regeneration of viscose on the interior surface of the tube is accomplished by feeding coagulation liquid to the interior tube portion present at the bottom of the mandrel. Thereafter the tube is removed from the bath and washed and dried to obtain the desired fibrous casing.

During the regeneration of cellulose on the tube interior, spent coagulation liquid accumulated within the lower interior portion of the tube is withdrawn therefrom by means of a vacuum line which extends through the length of the hollow mandrel and into the area of the tube interior where the spent liquid is accumulated. The imposition of the vacuum creates a pressure differential which acts on the liquid to cause it to flow upwardly in the vacuum line. The imposition of the vacuum to effect removal of the spent coagulation liquid has been also found to create a zone of negative pressure between the inner surface of the tube and the outer surface of the mandrel. The negative pressure between the inner and outer surfaces causes the tube to be drawn into wiping contact with the rings. Contact of the internal wall of the wet-coated tube with the rings causes a portion of the viscose coated on the wall to be scraped therefrom and collected on the rings. After continued passage of the wet impregnated tubes over the rings under these conditions, there results an excessive accumulation of viscose which eventually breaks loose from the rings and deposits on the internal surfaces of the tube which result in "viscose spots" in the finished casing, i.e., areas of uneven coating application. Poor yields of casing also result as the accumulation of viscose on the rings creates a drag force on the descending tube which causes the weakly sealed wet casing to rupture and tear apart.

SUMMARY OF THE INVENTION

The formation of viscose spots on the inner surfaces of fibrous casing during impregnation of the paper tube is substantially reduced and the yields of the casing are improved in accordance with the practice of the present invention wherein paper shaped in the form of a tube is passed downwardly over a mandrel and impregnated with viscose, there being provided means to supply within the tube interior during its downward passage over the mandrel an upward flow of gas at a low positive pressure, the gas flow being sufficient to support and maintain the cylindrical dimensions of the tube during its downward passage over the mandrel but insufficient to cause a measurable change in the dimensions of the tube walls whereby contact of the impregnated tube surface with the mandrel surface is substantially reduced.

THE DRAWINGS

Apparatus for use in the practice of the present invention is further illustrated in the accompanying FIGS. 1–3 in which:

FIG. 1 is a diagrammatic view of an apparatus used in the practice of the invention;

FIG. 2 is a cross-sectional view taken along line 2—2 of FIG. 1;

FIG. 3 is an enlarged fragmentary view of the apparatus of FIG. 1.

In the drawing, a ribbon of paper 11 of suitable width which is formed of natural cellulosic fibers, and which is preferably a long fiber, hemp paper weighing 10–20 pounds per ream, is fed from roll 12 and passed over rollers 13 and 14 and around guides 15 and 16 which fold the paper into a cylindrical tube 10 with the overlapping edges forming a seam to which viscose is applied by means of a pipe 16a, connected to a source of viscose, not shown. This seam is only weakly bonded with the applied viscose and is highly susceptible to rupture; the seam being strongly bonded only after the cellulose regeneration and drying steps of the fibrous casing manufacturing process are completed.

The weakly seamed paper tube 10 proceeds over mandrel 17 which may be a steel pipe having an outside diameter of one to seven inches, more or less, depending upon the size of the tube or casing which is to be produced. The mandrel 17 may be of a suitable length, conveniently about 30 feet long, and, as shown, can be suspended from a suitable support such as an I-beam 18 or the like. The paper tube 10 passes downwardly over the mandrel 17, through a forming ring 19 which is a metallic ring having an inside diameter slightly larger than the diameter of the paper tube passing through it. The forming ring 19 functions to maintain the paper in the form of a tube until it reaches the coating die 21.

Coating die 21 is a hollow annular structure of metal or the like and contains an annular opening 22, circumferentially of its inner face, through which viscose solution is applied to the outer surface of the downwardly moving paper tube 10. Viscose solution is supplied under positive pressure from the chamber of die 21 through the annular slit 22 to thoroughly coat the paper of the tube as well as thoroughly impregnate the paper of the tube 10 which moves downwardly through the die.

A sleeve 23, formed of synthetic resin material such as Nylon, Teflon or Delron, is mounted on the mandrel 17 to effect more uniform application of viscose through the orifice 22 as the paper tube 10 passes downwardly thereover. The sleeve 23 has provided on its internal surfaces a plurality of slots 24 through which air may be vented from the space 25 between the internal surface 26 of the tube 10 and the external mandrel surface 27.

A limited number, e.g., 4, of slip rings 28a and 28b are positioned on mandrel 17 at preselected intervals. The slip rings are frusto-conical shaped and have a flared skirt 29. The slip rings serve to keep the inside wall of the viscose impregnated tube from scraping against the outside wall of mandrel 17 as the tube moves downwardly. Two slip rings 28a are mounted on the mandrel above and below the forming ring 19 with the flared skirt 29 projecting downwardly on the mandrel, to promote the downward movement of the tube 10. A second set of slip rings 28b are mounted on the mandrel 17 below the coating die 21 with the flared skirt 29 projecting upwardly to promote the upward flow of gas introduced into the space 25 and to divert any gas flow in a radial outward direction as the gas flows upwardly.

Air or other gas such as nitrogen or $CO_2$, at a controlable low positive pressure, is admitted through flexible inlet 40, extending through the mandrel 17 from a source, not shown, to a tubular metal coil 30, e.g., aluminum coil, mounted on and encircling the mandrel 17 at a point near the lower end of the mandrel 17, the outer diameter of the coil 30 being less than the inner diameter of the tube 10 to permit the passage of the tube 10 thereover as the tube 10 is advanced into the coagulation bath 31. The gas admitted to the coil 30 is exhausted from the coil 30 into the interior of the tube 10 through a multiplicity of closely spaced apertures 30a provided in the upper surface of the coil 30 and is dispersed and flows upwardly therefrom and enters into the space 25 between the internal surface 26 of the tube 10 and the external mandrel surface 27. The air admitted to the tube 10 from the coil 30 is at a low positive pressure which is sufficient to compensate for any negative pressure between the inner surface 26 of the tube 10 and the outer surface 27 of the mandrel 17 and provide a continuous upward flow of gas in the tube interior and the space 25 and thereby support the tube 10 during its passage over the mandrel 17 but insufficient to materially inflate the tube 10 so that the resultant pressure exerted on the internal tube walls is substantially nil, in order that rupture of the tube is avoided as it is advanced downwardly over the mandrel 17.

Manometric means such as a regulator valve, not shown, may be utilized to control the pressure of the air admitted to the coil 30. The gas is admitted to the coil 30 at a low positive pressure generally in the range of about 1 to about 5 psi and preferably at about 1 to about 3 psi. It is critical to the practice of the present invention that the gas be at a low positive pressure and not exert any substantive force against the walls of the weakly seamed tubing. If the gaseous pressure within the tubing 10 exceeds about 5 psi, a force will be exerted on the walls of the viscose impregnated tube which will cause the tube seam to rupture and split apart, resulting in a break in the tube with consequent loss of casing production. The gas is vented from the fibrous casing manufacturing apparatus through the slots 24 of the sleeve 23 and out the open top of the apparatus.

Continuing in its downward movement, the viscose-impregnated paper tube 10 enters coagulating bath 31 contained in vessel 36. Coagulating bath 31 contains about 5 percent sulfuric acid and various salts. On contact with the acid bath, the viscose coated upon the outside walls of paper tube 10 is coagulated and regenerated. The conversion of viscose to regenerated cellulose begins and continues within the bath as the tube moves around roller 37 and continues as the tube moves over and under wiper rods 38 and 39, roller 41.

In carrying out the acid regeneration of cellulose on the paper tube 10, acid for the bath 30 is pumped through pipe 36a, from a source not shown, to effect the regeneration of cellulose from the viscose contained on the external walls of the tube 10. The same kind and concentration of acid is pumped to the interior of the casing through mandrel 17 through coagulation liquid inlet pipe 42 located interiorly of the hollow mandrel and which extends the entire length of the mandrel. Spent coagulation liquid 41 within the tube 10 is continuously withdrawn by pulling a vacuum through pipe 43 at a rate which is balanced by the incoming acid. Spent liquid is withdrawn from the interior of the tube 10 through the length of the mandrel 17 and is ejected from the opposite end of the vacuum line 43 into a collection means, not shown. The lower end of the acid inlet pipe 42 depends into the lower tapered end 44 of the mandrel 17 to feed coagulating liquid to the lower interior end portion of the descending tube 10. The spent coagulation liquid is allowed to collect within the interior of the tube 10 to a level within the tube which is slightly above, e.g., 0.1–0.5 inch, the level of the coagulation liquid in the bath 30. The lower or inlet end of the vacuum pipe 43 extends just to the liquid level of the spent coagulation liquid 41 within the tube.

The coagulated tube is then passed through washing baths and drying tunnels not shown here, but being substantially the same as those used in the art of making regenereated cellulose casings, as exemplified in U.S. Pat. No. 1,937,225 and related patents. For convenience in understanding the overall invention, the steps of washing, drying and reeling, and storage of the product casing are shown diagrammatically without reference to any particular apparatus for accomplishing those steps.

In the preparation of casing in accordance with this process, the speed of the casing in its downward movement is approximately 20–50 feet per minute, more or less, and the contact time in the acid bath 31 is of the order of 10–40 seconds.

The fibrous casing which is produced in this process is a tough, strong casing useful in the preparation of large sausages such as bolognas and the like, is substantially free of viscose spots and can be manufactured in yields approaching 90%.

What is claimed is:

1. An apparatus for the manufacture of fibrous sausage casing from a fibrous tube having interstices which can be filled with viscose which comprises in combination, means for advancing the tube, a mandrel having a top end and a bottom end over which the tube is axially advanced, means for impregnating the interstices of the tube with viscose while the tube is being advanced over the mandrel, means for coagulating the viscose impregnated in the tube with a coagulation agent, means for evacuating spent coagulating agent from the interior of the tube, gas applying means for directing a gas at a low positive pressure to flow between the tube and the mandrel, the gas flow being at a rate commensurate with the evacuation of the spent agent sufficient to support and maintain the tube in radially spaced relation to the mandrel but insufficient to cause a measurable change in the initial dimensions of the tube during the passage of the tube over the mandrel.

2. The apparatus of claim 1 wherein the gas applying means is a coil provided with a multiplicity of closely spaced apertures for directing upward flow of gas into the tube.

3. The apparatus of claim 2 wherein the coil is mounted at the bottom end of the mandrel.

4. The apparatus of claim 1 including diverter means to radially outwardly divert the gas as it flows upwardly through the tube.

5. The apparatus of claim 4 wherein the diverter means is a plurality of frusto-conical rings mounted on the mandrel.

6. In the method for manufacturing fiber-reinforced cellulose sausage casing wherein a paper tube is passed downwardly over a mandrel, impregnated with viscose, subjected to the action of a coagulating liquid to regenerate cellulose and spent coagulating liquid is removed from the interior of the tube, the improvement comprising causing a gas stream to be flowed within the tube as the tube is passed over the mandrel to maintain the tube in radially spaced relation to the mandrel as it is passed thereover, the gas stream being flowed at a pressure commensurate with the evacuation of the spent liquid sufficient to maintain the cylindrical dimensions of the tube but insufficient to cause a measurable change in the dimensions of the tube, whereby contact of the tube with the mandrel is substantially avoided.

7. The method of claim 6 wherein the gas stream is caused to flow in the tube at a low positive pressure.

8. The method of claim 7 wherein the pressure is in the range of about 1 to about 5 psi.

* * * * *